United States Patent
Hastings et al.

(10) Patent No.: US 6,370,629 B1
(45) Date of Patent: Apr. 9, 2002

(54) CONTROLLING ACCESS TO STORED INFORMATION BASED ON GEOGRAPHICAL LOCATION AND DATE AND TIME

(75) Inventors: Thomas Mark Hastings, Lexington, MA (US); Michael E. McNeil, Felton; Todd S. Glassey, Scotts Valley, both of CA (US); Gerald L. Willett, Malden, MA (US)

(73) Assignee: Datum, Inc., Bedford, MA (US)

( * ) Notice: Subject to any disclaimer, the term of this patent is extended or adjusted under 35 U.S.C. 154(b) by 0 days.

(21) Appl. No.: 09/182,342

(22) Filed: Oct. 29, 1998

(51) Int. Cl.$^7$ ................................................ H04L 9/00
(52) U.S. Cl. ...................... 711/163; 711/153; 711/164; 713/189; 713/193
(58) Field of Search ................................ 340/988, 992, 340/993, 991; 380/7, 25; 713/200, 189, 193; 711/163, 164, 147, 152, 153

(56) References Cited

U.S. PATENT DOCUMENTS

| | | | |
|---|---|---|---|
| 5,243,652 A | 9/1993 | Teare et al. | 380/21 |
| 5,553,143 A | 9/1996 | Ross et al. | 380/25 |
| 5,640,452 A | 6/1997 | Murphy | 380/5 |
| 5,646,992 A | 7/1997 | Subler et al. | 380/4 |
| 5,754,657 A | 5/1998 | Schipper et al. | 380/25 |
| 5,757,916 A | 5/1998 | MacDoran et al. | 380/25 |
| 5,799,082 A * | 8/1998 | Murphy et al. | 380/7 |
| 5,922,073 A * | 7/1999 | Shimada | 713/200 |
| 5,987,136 A * | 11/1999 | Schipper et al. | 380/25 |
| 6,046,689 A * | 4/2000 | Newman | 340/996 |
| 6,057,779 A * | 5/2000 | Bates | 340/825.31 |
| 6,057,799 A * | 5/2000 | Bates | 340/825.31 |

* cited by examiner

*Primary Examiner*—Than Nguyen
(74) *Attorney, Agent, or Firm*—Knobbe, Martens, Olson & Bear, LLP

(57) ABSTRACT

Access to stored information by a user is controlled by comparing an actual geographic position and/or an actual date/time with a geographic region and/or a date/time interval within which access to the stored information is authorized. The actual geographic position where the stored information is located, and the actual date/time can be determined, for example, based on signals received at a receiver supplying reliable position and time information, such as a GPS receiver. Access to the stored information is authorized if the actual geographic position and/or date/time falls within the authorized geographic region and/or date/time interval. The position and date/time information supplied by the receiver may be cryptographically signed and encrypted.

32 Claims, 6 Drawing Sheets

CONTROLLING ACCESS TO STORED INFORMATION BASED ON GEOGRAPHICAL LOCATION AND DATE AND TIME

BACKGROUND

This invention relates to controlling access to stored information.

Data distribution media, such as a CD-ROM, can store a large number of files. The producer of the CD-ROM may wish to control access by users to particular files, either because they are confidential or because access is subject to payment by the user.

Access may be controlled by requiring a user to enter a password obtained from the CD-ROM producer. Different passwords may unlock different files or different subsets of files. The files may be cryptographically signed and for added protection, may be encrypted. In the scheme discussed in U.S. Pat. No. 5,646,992, incorporated herein by reference, each file is encrypted by the producer with a unique key known only to the producer. The user receives the encrypted items and, after his request for access is processed by the producer, also receives decryption keys, i.e., passwords, which are used to decrypt the respective encrypted files. The passwords unlock only those files for which access has been requested.

SUMMARY

In general, in one aspect of the invention, the invention features controlling access to stored information by determining an actual geographic position where the stored information is located based on signals received at a receiver supplying reliable position information. The actual geographic position is then compared with a geographic region within which access to the stored information is authorized. The user is permitted access to the stored information if the actual geographic position is located within the authorized geographic region.

Embodiments of the invention include the following features. The receiver that supplies the position information can receive the position information from a satellite-based location determination system or an inertial navigation system. The information can be stored on a computer-readable medium, such as a high-capacity disk. The stored information includes files and each of these files has an associated geographic region within which access is permitted. The user has access to a specific file or files if the actual geographic position is located within the authorized geographic region for this file. The stored information can be encrypted, and the user has access to the decryption key only if the actual geographic position is located within the authorized geographic region. The stored information can also be divided into subsets of information and wherein at least one the subsets has a different authorized region from the other subsets. The association of the files with the authorized geographic regions can be stored as a policy file together with the stored information.

In general, in another aspect, the invention features determining an actual date or time at the location of the stored information based on signals received at a receiver supplying reliable time information. The actual date or time is compared with a predetermined date or time interval at which access to the stored information is authorized. The user can access the stored information if the actual date or time occurs within the authorized date or time interval.

In general, in another aspect, the invention includes a receiver supplying reliable position information for determining an actual geographic position where the stored information is located. A computer receives the position information with a geographic region within which access to the stored information is authorized and permits access to the stored information if the actual geographic position is located within the authorized geographic region.

Embodiments of the invention include the following features. The receiver includes a receiver encryption mechanism for cryptographically signing the actual geographic position with a receiver encryption key and verifying the receiver signature with a receiver decryption key before the actual geographic position is compared with the authorized geographic region.

In general, in yet another aspect, the invention includes a reader with a corresponding receiver decryption key for verifying the cryptographically signed actual position.

Embodiments of the invention include the following features. The reader generates an initialization vector providing a position offset which is transmitted to the receiver and added to the actual geographic position. The reader crytographically signs the position offset with a reader encryption key. The receiver verifies the position offset signature with a corresponding reader decryption key before the position offset is added to the actual geographic position.

In general, in another aspect, the invention features forming a policy associating the information with authorized geographic regions and authorized time intervals and cryptographically signing the policy and the information. The signed policy is stored together with the signed information. The user obtains from the producer a password for unlocking the policy and obtains access to the stored information if the actual geographic position and actual time falls within the authorized geographic regions and authorized time interval of the policy.

Among the advantages of the invention are one or more of the following.

A producer of stored information can restrict use of that information to designated geographic regions or can exclude designated regions where use is not permitted. For example, a service manual for an automobile stored on a CD-ROM may contain different sections of information which are applicable to corresponding specific countries and/or regions. A user may be permitted to see only the portion of the information which is applicable to his current geographic location. Likewiese, access to a sensitive corpoarte report may be limited to specific plant location. Access to time-sensitive information may be denied before or after a certain date or limited to a permitted period. By associating information about authorized geographic regions and time intervals with policy files stored on the CD-ROM and accessed with a user password, the CD-ROM producer can issue a new password to permit the user to access a particular set of policy files, and therefore the information authorized, for a corresponding region and date/time.

Other advantages and features will become apparent from the following description and from the claims.

DESCRIPTION

Figure 1:
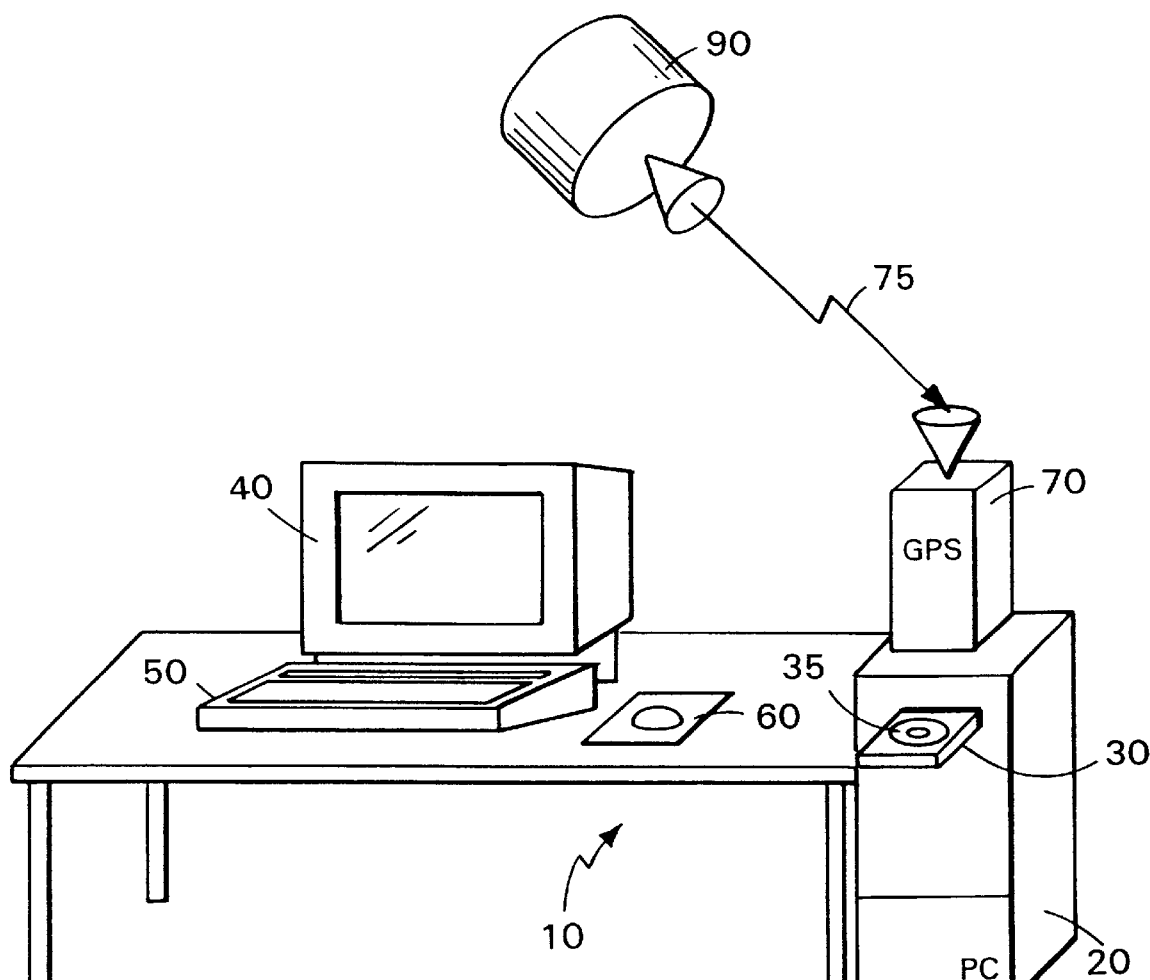
FIG. 1 is a perspective view of a computer system.
Figure 2:
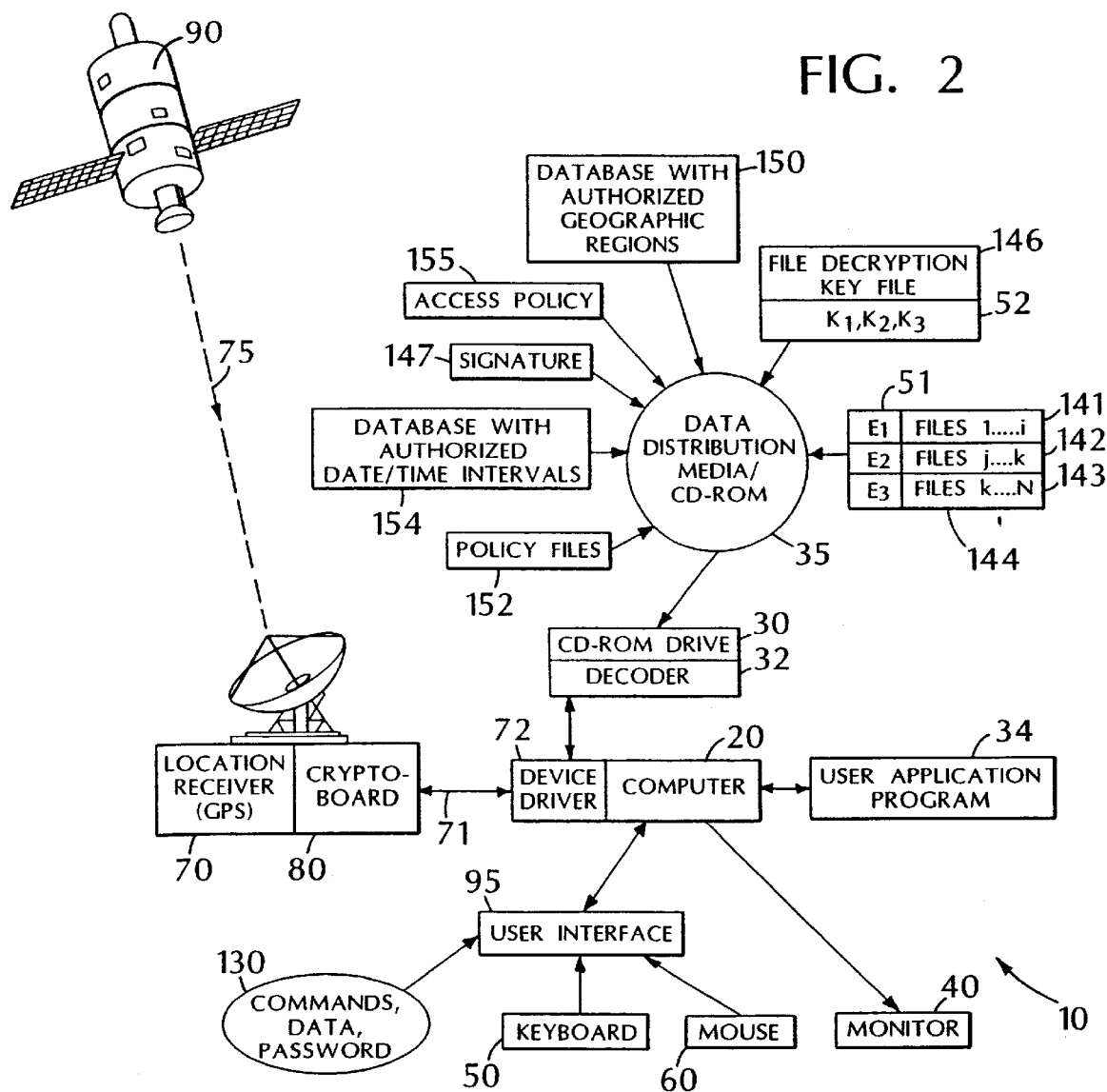
FIG. 2 is a block diagram of a computer-based system for controlling access to stored information.
Figure 3:
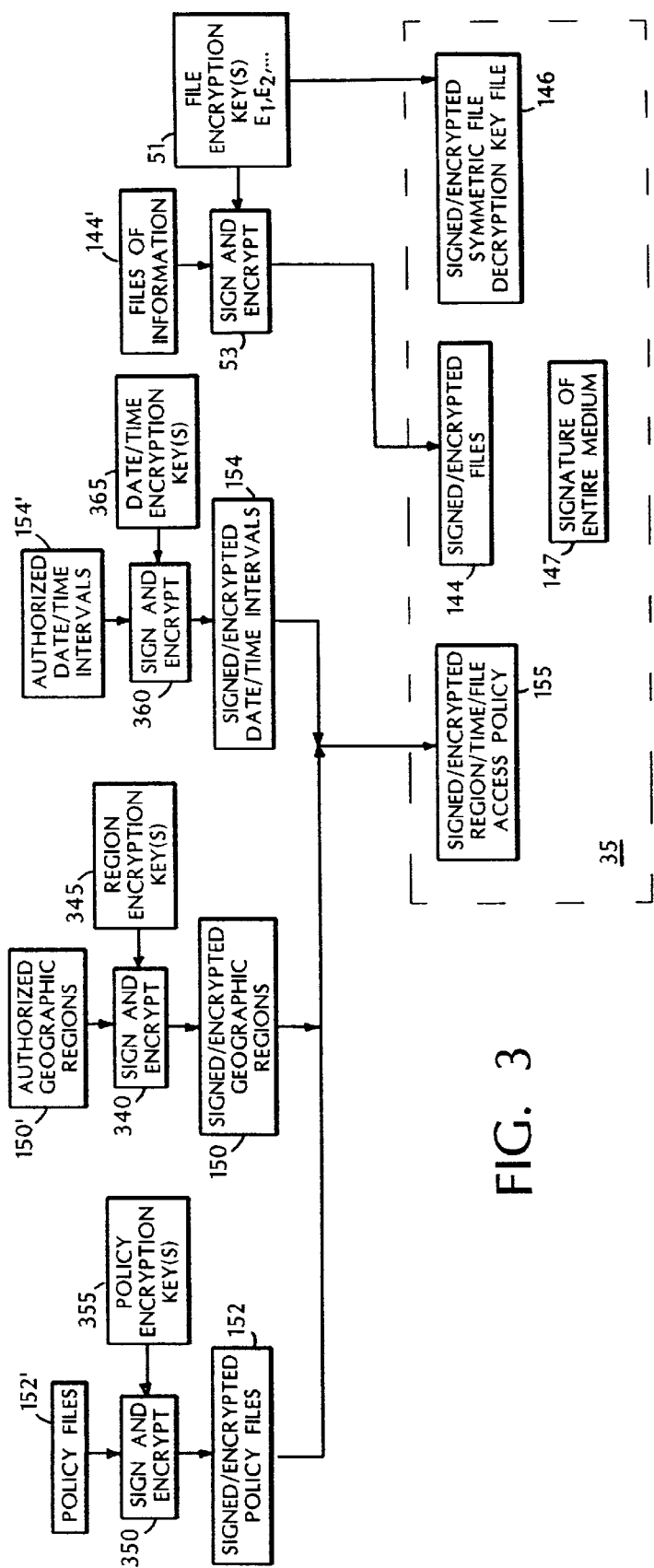
FIGS. 3 through 5 are flow diagrams.

As seen in FIGS. 1 to 3, access to information which is stored on a portable computer-readable CD-ROM which serves as a data distribution media 35, may be controlled based on an actual geographic position of a computer system 10 on which the information is to be accessed and the time when it is to be accessed.

In computer system 10, a computer 20 is connected to a keyboard 50, a mouse 60, a monitor 40, and a CD-ROM drive 30. A GPS receiver 70 serves as a source of reliable position and time information. The receiver 70 is located at the actual geographic position of the computer system 10 and receives signals 75 from orbiting GPS satellites 90 (only one shown). The receiver 70 converts the received signals 75 to geographic position data 71 to an accuracy of several meters in longitude, latitude and height and to date/time data 71 to an accuracy of microseconds. The data 71 are transmitted to the computer 20 via a device driver 72.

Figure 6:
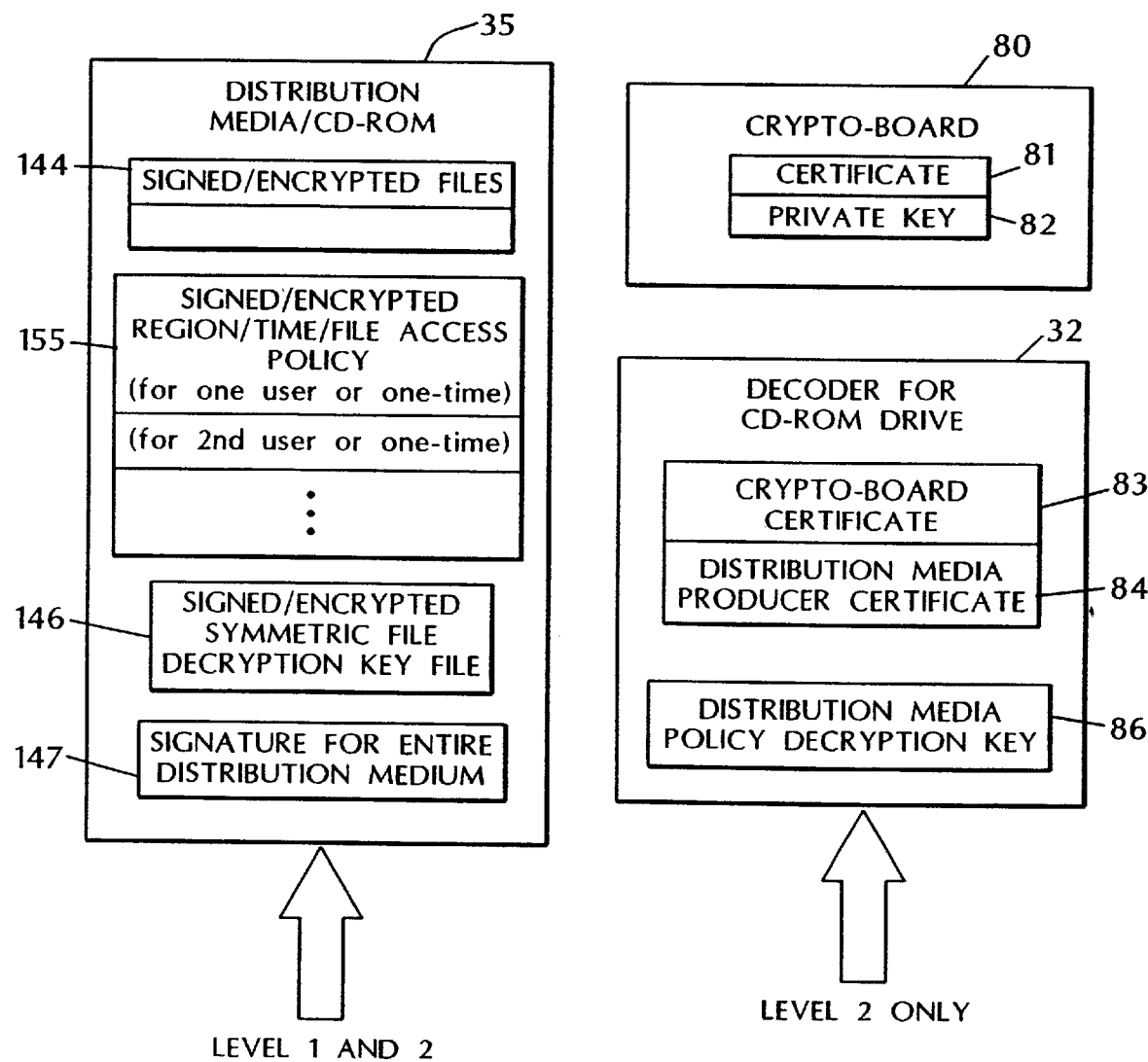
FIG. 6 is a block diagram of cryptographic elements.

A receiver crypto-board 80 may contain a public-key certificate 81 signed by the producer and a corresponding private key 82, as shown in FIG. 6. The geographic position and date/time data 71 may then be signed with the private key 82 to authenticate the data.

The CD-ROM drive 30 may also include encryption and signature capabilities (decoder 32) which may be implemented either in hardware or in software. The decoder 32 includes a crypto-board public-key certificate 83 which is identical to certificate 81, a producer certificate 84 for verification of the producer's identity, and a distribution media policy decryption key 86 signed by the producer, as shown in FIG. 6. The crypto-board certificate 83 verifies the signature of the crypto-board 80 signed with the private key 82. The policy decryption key 86 decrypts the access policy 155 stored on the CD-ROM 35.

The computer system 10 can have several levels of security, such as Level 1 and Level 2, described in the following examples.

In a system with Level 1 security, the receiver 70 communicates with the computer 20 via a conventional device driver 72 and the CD-ROM drive 30 is a conventional CD-ROM. Neither the receiver 70 nor the CD-ROM drive 30 have additional encryption/decryption capabilities. For increased security, the computer 20 in a Level 1 system can be a "trusted" computer which can authenticate and/or encrypt data. In a more secure, Level 2 system, the receiver 70 may include a crypto-board 80 and the CD-ROM drive 30 may include a decoder 32. The Level 2 system is designed to provide data authenication and encrypted data transmission between the receiver 70 and the decoder 32. The computer 20 can then be any commerical computer without data authentication and encryption.

Data entered via the keyboard 50 and mouse 60 may include typical command and data input 130 entered via a user interface 95 (provided by an application program 34) and one or more passwords 130 that permit a user to gain access to information stored on the data distribution media 35.

The CD-ROM 35 stores different types of information, such as files with information 144, a list 150 of authorized geographic regions, a list 154 of authorized date/time intervals, one or more file decryption key files 146, one or more policy files 152 and a signature 147 for the entire CD-ROM 35. As seen in FIG. 3, the files 144, 146, 150, 152, 154 and 155 may be signed and encrypted.

The files 144 may be grouped in subsets 141, 142 and 143. Files may belong to more than one subset. (In the following discussion, the term file refers to both files and subsets of files.) Each file 141, 142 and 143 may be encrypted with a unique file encryption key 51 ($E_1$, $E_2$, $E_3$). The corresponding file decryption keys 52 ($K_1$, $K_2$, $K_3$) are stored on the CD-ROM 35 in the file decryption key file 146. Additional information about the decryption keys and the decryption key file are found in U.S. Pat. No. 5,646,992.

Each file 141, 142 and 143 on the CD-ROM 35 is associated with zero, one or more of the authorized geographic regions stored in the list 150 of authorized geographic regions. For example, a region may be bordered by latitudes and longitudes corresponding to the extent of the Empire State Building in New York City and an altitude of between 50 and 60 meters, so that the file associated with that region can only be opened if the receiver 70 is located in a certain office area inside the Empire State Building.

Likewise, each file 141, 142 and 143 is associated with zero, one or more of the authorized date/time intervals stored in the list 154 of authorized date/time intervals.

Each GPS satellite 90 maintains an extremely accurate clock. The receiver 70 receives the GPS clock signals as part of signals 75, or a local atomic clock can provide similar clock signals. The clock signals enable control of access to the information based on the actual time when access to the information is attempted. For example, the producer can specify that access is to be granted only (1) before a predetermined date/time; (2) after a predetermined date/time; or (3) only during a predetermined date/time period.

The producer can associate the files 141, 142 and 143 with specific items in the lists 150 and 154 via a password 130 which the user enters via keyboard 50. The password 130 can be a user password valid for more than one access, or can be a one-time password. Alternately, the producer can associate specific geographic region/date/time information of lists 150 and 154 with the files 141, 142 and 143 via the policy files 152. A valid user password 130 may unlock one or more policy files 152. If the user's actual geographic position and the current date and time are within the authorized geographic region and the authorized date/time corresponding to the user password 150, then the user can access the selected files via the user interface 95. The selected information is then displayed on output device 40.

Table 1 shows, as an example, how five encrypted files, A to F, stored on the CD-ROM 35 and associated with corresponding authorized geographic regions and dates/times, can be accessed. Each file is associated with one of four different file decryption keys K1 to K4. L1 and L2 are two different authorized geographic regions and T1, T2 and T3 are three different authorized date/time intervals. The user who is in possession of the file decryption key K1, e.g., a password, can decrypt Manual A within the geographic regions L1 and L3 at time T1. The same user can also decrypt Manual D at the same time T1 in regions L2 and L3, but not within region L1. Likewise, the user who has key K2 can decrypt Image B and Image E within the region L2, but not at the same time. Drawing C can be decrypted with key K3 at any location, but only at time T3, while the Business Report F requires key K4 and can be decrypted at any time, but only within the region L1.

TABLE 1

| Encrypted File | File Decryption Key | Authorized Geographic Regions | Authorized Date/Time Intervals |
| --- | --- | --- | --- |
| Manual A | K1 | L1, L3 | T1 |
| Image B | K2 | L2 | T1, T3 |
| Drawings C | K3 | — | T3 |

TABLE 1-continued

| Encrypted File | File Decryption Key | Authorized Geographic Regions | Authorized Date/Time Intervals |
| --- | --- | --- | --- |
| Manual D | K1 | L2, L3 | T1 |
| Image E | K2 | L2 | T2 |
| Report F | K4 | L1 | — |

As shown in FIG. 3, for purposes of cryptographic signature with optional encryption, the producer selects source files 144' to be written on the CD-ROM 35 and specifies a list of authorized geographic regions 150' and a list of authorized date and time intervals 154'. The producer associates (as shown in Table 1) each file or subset of files with zero, one or more geographic regions 150' and zero, one or more date/time intervals 154' and stores this association in a policy file 152'. Each of the files 144', 150', 152', 154' can be signed and encrypted in steps 53, 340, 350 and 360 with corresponding encryption keys 51, 345, 355 and 365, respectively. The corresponding encrypted files 150, 152 and 154 are then stored together on the CD-ROM 35 as a signed, encrypted region/time/file access policy 155. Also stored on the CD-ROM 35 are, as mentioned above, the signed/encrypted files 144, the signed/encrypted symmetric file decryption key file 146 and the signature 147 used by the producer to sign the entire CD-ROM 35.

Figure 4:
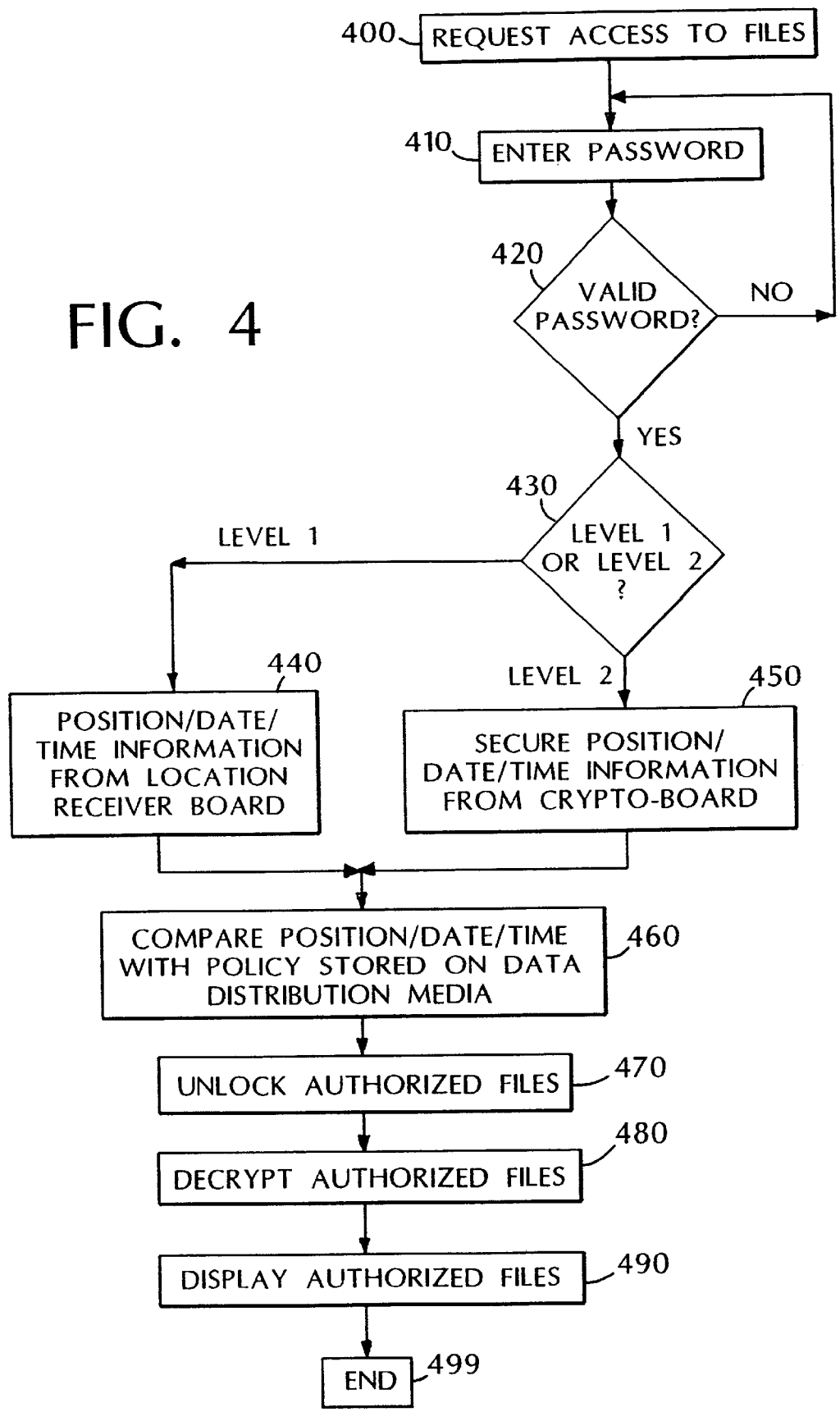
Figure 5:
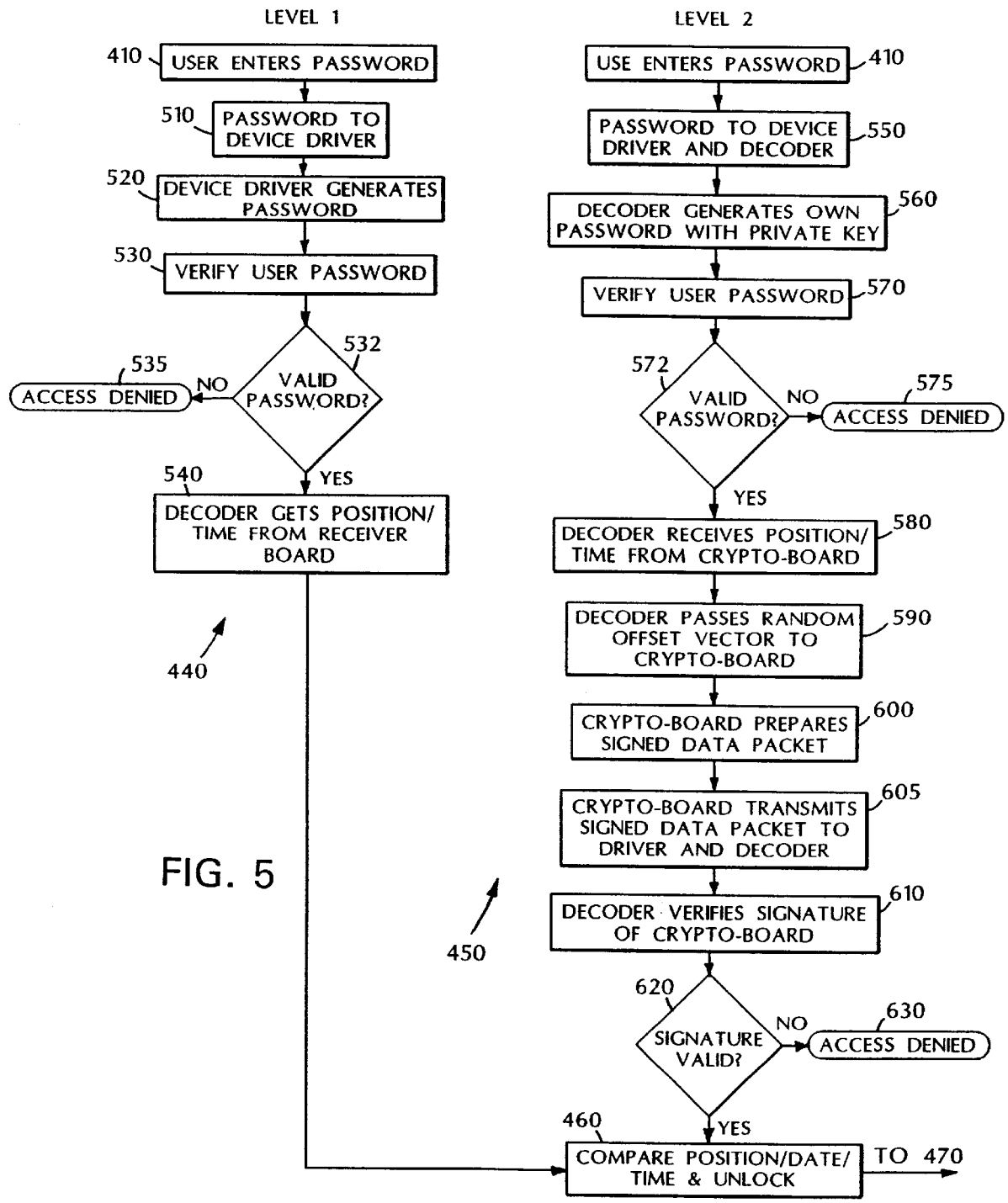

As seen in FIGS. 4 and 5, to gain access to the signed/encrypted files 144, the user obtains a password 130 (FIG. 2) from the producer (step 400), and enters the password 130 via the keyboard 50 (step 410). The password 130 is assumed to be a one-time password, although user passwords valid for more than one session can also be used.

As seen in FIG. 4, the early portions of the process flow for Level 1 and Level 2 are almost identical.

Step 420 checks the password 130 and the process then executes either 440 (for Level 1, with no additional security) or to 450 (for Level 2, with receiver/CD-ROM drive security), depending on the system configuration. Details of steps 440 and 450 are shown in FIG. 5 and will now be discussed.

As seen in FIG. 5, in process 440 the user password 130 is sent to the device driver 72 (step 510). In response to the one-time password 130, the device driver 72 generates from the user's password 130 its own one-time password (step 520) and verifies (step 530) that the user did indeed enter a correct one-time password 130, thus authenticating the user for the interactive session (step 532). Otherwise, access is denied (step 535).

Once the password 130 has authenticated the user, the device driver 72 interrogates the receiver 70 for the current position and date/time (step 540). The device driver 72 then compares the time and position data returned by the receiver 70 with the policy 155 which applies to the files 144 or a subset 141, 142 and 143 of files (step 460). If the user is authorized to access the files 144, then the data is unlocked, decrypted (step 470, FIG. 3) with decryption keys 52 (step 480) and supplied to the user's application program 34 (step 490) and displayed.

In a Level 2 system, the receiver 70 includes the cryptographic receiver board 80, hereafter referred to as "cryptoboard". As mentioned before, crypto-board 80 can sign and encrypt/decrypt messages. The CD-ROM drive 30 includes decoder 32 to decode the position data signed by and received from the crypto-board 80.

As seen in FIG. 5, in process 450, the user's password 130 is sent to the device driver 72, which accepts the password 130 and passes it through unaltered to the decoder 32 (step 550). The driver 32 then internally generates with the private key 86 its own one-time password corresponding to the user's password (step 560) and verifies (step 570) that the correct password 130 was communicated by the device driver 72, thus authenticating the user for the interactive session (step 572). Otherwise, access is denied (step 575).

Once the encryption circuit 32 has authenticated the user, the driver 32 interrogates the crypto-board 80 via the device driver 72 for the current time and position information from receiver 70 (step 580). The decoder unit 30 provides the crypto-board 80 with a signed random or other bit pattern to form an "initialization vector" (step 590), i.e., a position offset, which the device driver 72 passes through the crypto-board 80 along with the request for the time and position (step 590).

The crypto-board 80 responds by preparing a packet according to a pre-established data format which includes the current time and the actual geographic position in latitude and longitude and altitude (step 600). Also included may be information identifying the satellites transmitting the position data as well as other data necessary for the computations. The crypto-board 80 also stores the provided initialization vector at a known offset within the packet and applies a cryptographic signature to the contents of the packet. The cryptographic signature can be, for example, a message digest/hash of the packet data, plus an encryption of the message digest according to some predetermined key, and may be symmetrical or asymmetrical, depending on the key or certificate stored on the crypto-board 80.

The crypto-board 80 then transmits (step 605) the signed time/location packet to the device driver 72 which relays the packet to the decoder 32/CD-ROM drive 30. The decoder 32 compares the signature of the packet received from the crypto-board 80 with a signature stored in the decoder 32 (step 610). If the signature verifies properly (step 620), the initialization vector within the packet is examined to determine if the initialization vector is indeed the same initialization vector which the decoder 32 provided to the crypto-board 80 in step 590. If this is the case, then the packet received by the decoder 32 is recent and genuine, and the time and position data are accepted as valid.

Once the packet from the crypto-board 80 is authorized based on the signature and the initialization vector, the decoder 32 compares the time and position data received from the crypto-board 80 with the policy 155 which applies to the files 144 or to a subset of files 144 (step 460). If the user is authorized to access the files 144, then the data is unlocked (step 470), decrypted with decryption keys 52 (step 480) and supplied to the user's application program 34 and displayed (step 490).

Other embodiments are within the scope of the following claims. For example, the GPS receiver need not be located at the exact position of the data distribution media reader but could be in a known location (such as a room containing a control server providing computer service to a local area network in a building) relative to the reader.

The policy files 152' may also designate geographic regions where access to certain files 144 is denied.

Control over access to files need not be limited to the use of passwords provided by the producer and entered via a keyboard. For example, certain biometric attributes, such as facial features, finger prints and/or voice prints may be substituted for or used in addition to passwords.

What is claimed is:

1. A method for controlling access to stored information comprising:
   determining an actual geographic position where said stored information is located based on signals received at a receiver supplying reliable position information;
   cryptographically signing said actual geographic position with a receiver encryption key;
   verifying the signature of said actual geographic position;
   determining that said actual geographic position is within a geographic region within which access to said stored information is authorized; and
   permitting access to said stored information.

2. The method of claim 1, wherein said receiver comprises a GPS receiver.

3. The method of claim 1, wherein said information is stored on a computer-readable medium.

4. The method of claim 3, wherein said computer-readable medium is portable.

5. The method of claim 3, wherein said computer-readable medium comprises a high-capacity disk.

6. The method of claim 1, wherein said stored information comprises files and each of said files has an associated geographic region within which access is permitted, and further permitting access to said file if said actual geographic position is located within said authorized geographic region for said file.

7. The method of claim 6, further comprising denying access to said stored information if said actual geographic position does not match said authorized geographic region.

8. The method of claim 6, wherein said association of the files with the authorized geographic regions is stored as a policy file together with said stored information.

9. The method of claim 1, further comprising:
   encrypting said stored information using an encryption key; and
   providing a decryption key which permits decryption of said stored information if said actual geographic position is located within said authorized geographic region.

10. The method of claim 1, wherein said stored information is divided into subsets of information and wherein at least one the subsets has a different authorized region from the other subsets, so that access is authorized to the subset whose authorized geographic region is located within the actual geographic position, but not to the subsets whose authorized geographic region is not located within the actual geographic position.

11. Apparatus for controlling access to stored information comprising:
   a receiver supplying reliable position information for determining an actual geographic position where said stored information is located, wherein the receiver comprises a receiver encryption mechanism providing a receiver encryption key for cryptographically signing data comprising the actual geographic position; and
   a computer for comparing said actual geographic position with a geographic region within which access to said stored information is authorized,
   wherein said computer permits access to said stored information if said actual geographic position is located within said authorized geographic region.

12. The apparatus of claim 11, wherein said receiver is a GPS receiver.

13. The apparatus of claim 11, further comprising a reader for reading said stored information wherein said reader comprises a receiver decryption key for verifying the data comprising said cryptographically signed actual position.

14. The apparatus of claim 13, wherein said reader generates an initialization vector which is transmitted to the receiver and included in the signed data.

15. The apparatus of claim 14, wherein said signed initialization vector is verified by the reader before said computer permits access to said stored information.

16. A method for controlling access to a subset of files belonging to a larger set of files of stored information comprising:
   associating a unique file encryption key with each file from the larger set of files and encrypting the files using the associated encryption keys;
   associating each of the files from the larger set of files with at least one authorized geographic region within which access to said stored information is authorized;
   determining an actual geographic position where said stored information is located based on signals received at a receiver supplying reliable position information;
   cryptographically signing at least the actual geographic position at the receiver;
   verifying the signature of the actual geographic position;
   comparing said actual geographic position with said authorized geographic region; and
   providing a file decryption key which authorizes access to and permits decryption of said files belonging to said subset of files, provided that the actual geographic position is located within the authorized geographic region for the files belonging to said subset of files.

17. The method of claim 16, wherein said association of the files with the authorized geographic regions is stored as a policy comprising policy files wherein each policy file is accessible with a user password and authorizes, if the user password is valid, access to the files listed in said policy file, if the actual geographic position is located within the authorized geographic region associated with the files.

18. The method of claim 17, wherein said policy is stored with the stored information.

19. A method for controlling access to stored information comprising:
   determining an actual date or time at the location of said stored information based on signals received at a receiver supplying reliable time information;
   cryptographically signing at least the actual date or time at the receiver;
   verifying the signature of the actual date or time;
   comparing said actual date or time with a predetermined date or time interval at which access to said stored information is authorized; and
   permitting access to said stored information if said actual date or time occurs within said authorized date or time interval.

20. The method of claim 19, further comprising denying access to said stored information if said actual date or time does not occur within said authorized date or time interval.

21. The method of claim 19, wherein said information comprises files and each of said files has an associated authorized date or time interval within which access is permitted, and further permitting access to said file if said actual date or time occurs within said associated authorized date or time interval.

22. The method of claim 19, wherein said stored information is divided into subsets of information and wherein at least one of the subsets has a different authorized date or time interval from the other subsets, so that access is authorized to the subset whose authorized date or time interval matches the actual date or time, but not to the subsets whose authorized date or time interval does not match the actual date or time.

23. A method for controlling access to stored information comprising:

forming a policy associating said information with authorized geographic regions and authorized time intervals;

cryptographically signing said policy and said information;

storing said signed policy together with said signed information;

providing a password for unlocking said policy;

determining an actual geographic position where said stored information is located based on signals received at a receiver supplying reliable position information;

determining an actual time;

cryptographically signing at least the actual geographic position and the actual time at the receiver;

verifying the signature of the actual geographic position and the actual time;

comparing said actual geographic position and said actual time with said authorized geographic regions and authorized time interval of said policy; and permitting access to said stored information if said actual geographic position and actual time falls within said authorized geographic regions and authorized time interval of said policy.

24. The method of claim 23, wherein position and time are determined through a Global Orbiting Navigational Satellite System.

25. The method of claim 23, wherein position is determined through an inertial navigation system.

26. The method of claim 23, wherein position is determined through a satellite based location determination system.

27. A method for controlling access to stored information, the method comprising:

(a) determining a position;

(b) cryptographically signing data comprising at least a representation of the position;

(c) verifying the signature of the data comprising at least a representation of the position;

(d) determining that access to the stored information is authorized at the position; and (e) permitting access to the information based at least upon (c) and (d).

28. The method of claim 27, further comprising (f) providing the cryptographically signed data to an information accessing device, wherein (c) and (e) are performed by the information accessing device.

29. The method of claim 28, further comprising:

(g) identifying a token;

(h) incorporating the token in the data that is cryptographically signed; and (i) verifying that the cryptographically signed data comprises the token.

30. The method of claim 29, wherein (g) and (i) are performed by the information accessing device.

31. The method of claim 29, wherein (a), (b), and (h) are performed by a position determining device.

32. The method of claim 29, further comprising (j) providing the token to the position determining device.

\* \* \* \* \*